3,520,897
Patented July 21, 1970

1

3,520,897
CERTAIN 5-DIALKYLAMINO-1,2,4-DITHIAZOLE-3-ONES AND 3-THIONES AND PREPARATION
James Wellington Clapp, Princeton, Thomas Andrew Lies, Montgomery Township, Somerset County, and Glentworth Lamb, Trenton, N.J., assignors to American Cyanamid Company, Stamford, Conn., a corporation of Maine
No Drawing. Filed Aug. 7, 1968, Ser. No. 750,757
Int. Cl. C07d 91/04
U.S. Cl. 260—306.7                 7 Claims

---

ABSTRACT OF THE DISCLOSURE

Novel compounds of the formula:

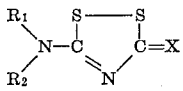

wherein $R_1$ and $R_2$ are lower alkyl radicals of from 1 to 4 carbon atoms and X is sulfur or oxygen are disclosed as is a process for their preparation, and their use to control bacteria and fungi and protect organic materials and agronomic crops, both growing and harvested, from attack by bacteria and fungi.

---

The present invention relates to novel compounds of the formula

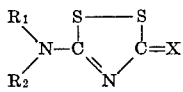

wherein $R_1$ and $R_2$ are lower alkyl radicals such as methyl, ethyl, propyl, isopropyl and butyl and X is sulfur or oxygen to their process of preparation and to their use as bactericides and fungicides.

In the preparation of the above compounds, a tetraalkylguanidine is reacted with carbon disulfide in the presence of strong base to yield the alkali bis(dialkylamino)methylenedithiocarbamate which, when further treated with a nonoxidizing acid such as acetic or hydrochloric acid gives the corresponding inner salt of "zwitterion"

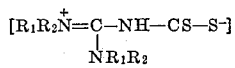

Treatment of the zwitterion with sulfur monochloride then yields the 5 - dialkylamino-3H-1,2,4-dithiazole-3-thiones can be converted to the corresponding oxygen analogue, by reaction with oxidizing agents, such as chlorine and treatment of the dichlorinated product with water.

As noted the 5 - dialkylamino-3H-1,2,4-dithiazole-3-thiones and 5 - dialkylamino-3H-1,2,4-dithiazole-3-ones can be prepared from tetraalkylguanidines. In general the process involves the reaction of a tetraalkylguanidine of the formula:

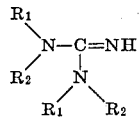

wherein $R_1$ and $R_2$ are lower alkyl radicals of from 1 to 4 carbon atoms, with carbon disulfide and a strong base such as sodium or potassium hydroxide. Preferably the alkylguanidine and carbon disulfide are employed in about equimolar amounts although a slight excess of carbon disulfide may be employed. The reaction can be conducted over a wide temperature range, however, it is usu-

2 ally most satisfactorily carried out at a temperature between about 0° and 30° C. in aqueous solution. The reaction may be graphically illustrated as follows:

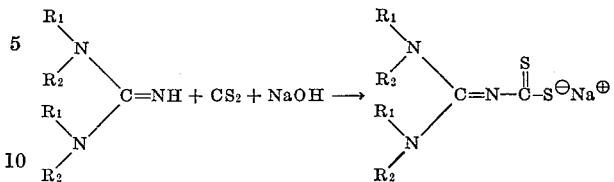

This bis(dialkylamino)methylenedithiocarbamic acid alkali salt is then readily converted to the corresponding inner salt or "zwitterion" by treatment with a non-oxidizing acid such as acetic acid or hydrochloric acid. Advantageously, the reaction is carried out in aqueous solution at a temperature between about —5° to 10° C. and employing about equimolar amounts of the dithiocarbamate salt and the acid. Somewhat higher or lower temperatures may be employed but with less advantage. The reaction is graphically illustrated below.

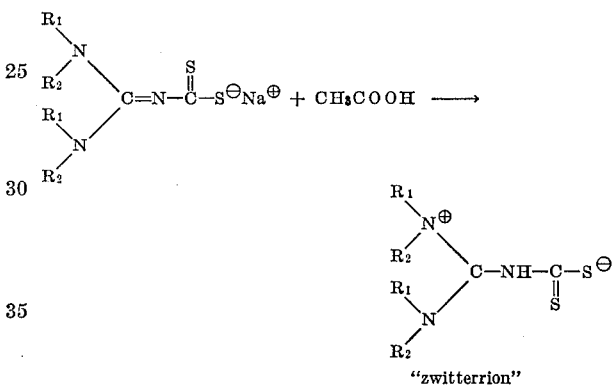

"zwitterrion"

The zwitterion may be separated from the reaction mixture by any convenient means, as by filtration, centrifugation or the like. It is then preferably washed with ethanol and then ether or a hydrocarbon. After separation the zwitterion is slurried in water and treated with sulfur monochloride to yield the 5-dialkylamino-3H-1,2, 4-dithiazole - 3-thione. This reaction is preferably carried out at a temperature between about —5 and 16° C. with a mole ratio of zwitterion to sulfur monochloride of 1:0.5 The reaction slurry is then allowed to warm to between about 20° and 30° C. and is stirred for from 1 to 2 hours at this temperature. The product is collected, as by filtration, washed with water and then optionally with methanol to remove impurities. This reaction is graphically illustrated below:

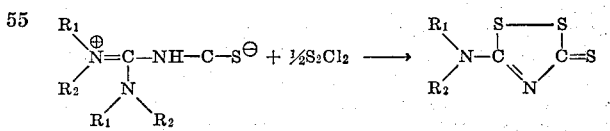

Furthermore an alkali metal salt of a bis(dialkylamino)methylenedithiocarbamic acid can be converted to the 5 - dialkylamino - 3H-1,2,4-dithiazole-3-thione by causing it to react with hydrogen peroxide.

Another process for the preparation of the compounds consists of vigorously stirring a mixture of the appropriate 1,1-dialkylthiourea, carbon disulfide, and 87% potassium hydroxide pellets in dimethylformamide at 0°–50° (25° preferred). The resulting product is collected, dissolved in water, and treated with a mild oxidizing agent, such as atmospheric oxygen, at 0°–50° (25° preferred). The resulting precipitate of 5-dialkylamino-3H-

1,2,4-dithiazole-3-thione is collected, washed with water and dried in air.

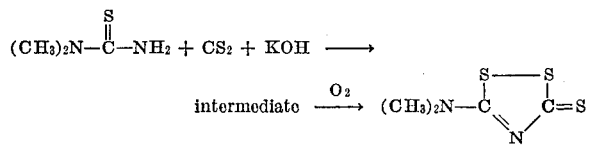

Oxidation of the thus formed product yields the corresponding oxygen analogue. This can be accomplished by treating 5-dialkylamino-3H-1,2,4-dithiazole-3-thione with chlorine at high temperature (i.e., about 50° C. or higher) and treating the thus formed dichloride with water to form the 5 - dialkylamino-3H-1,2,4-dithiazol-3-one. The reaction may be shown as follows:

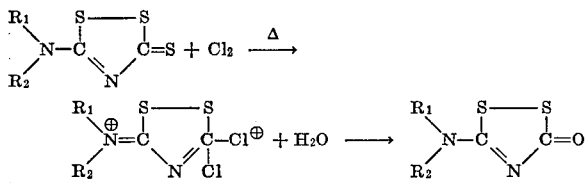

Among the compounds contemplated by the present invention are:

5-dimethylamino-3H-1,2-4-dithiazole-3-thione
5-diethylamino-3H-1,2,4-dithiazole-3-thione
5-diisopropylamino-3H-1,2,4-dithiazole-3-thione
5-dipropylamino-3H-1,2,4-dithiazole-3-thione
5-dibutylamino-3H-1,2,4-dithiazole-3-thione
5-(N-ethyl-N-methylamino)-3H-1,2,4-dithiazole-3-thione
5-(N-ethyl-N-isopropylamino)-3H-1,2,4-dithiazole-3-thione
5-(N-butyl-N-ethylamino)-3H-1,2,4-dithiazole-3-thione
5-(N-methyl-N-propylamino)-3H-1,2,4-dithiazole-3-thione
5-(N-isopropyl-N-methylamino)-3H-1,2,4-dithiazole-3-thione
5-dimethylamino-3H-1,2,4-dithiazol-3-one
5-diethylamino-3H-1,2,4-dithiazol-3-one
5-dipropylamino-3H-1,2,4-dithiazol-3-one
5-diisopropylamino-3H-1,2,4-dithiazol-3-one
5-dibutylamino-3H-1,2,4-dithiazol-3-one
5-(N-ethyl-N-methylamino)-3H-1,2,4-dithiazol-3-one
5-(N-butyl-N-methylamino)-3H-1,2,4-dithiazol-3-one
5-(N-ethyl-N-isopropylamino)-3H-1,2,4-dithiazol-3-one
5-(N-ethyl-N-propylamino)-3H-1,2,4-dithiazol-3-one and similar compounds.

As indicated above the compounds of the invention are useful as bactericidal and fungicidal agents. They may be employed under a wide variety of conditions and for various uses including the treatment of industrial cooling waters, swimming pools, and pond waters used for the manufacture of paper products, for the treatment of textiles, leather goods, fabrics and the like and for the protection of agronomic crops, both growing and harvested, against attack by pathogenic bacteria and fungi.

For the treatment of industrial fluids, generally about 100 p.p.m. and frequently as little as 10 to 15 p.p.m. of a compound of the instant invention is effective for inhibiting development and/or proliferation of bacteria and fungi in such systems.

It has also been found that living plants, harvested crops and organic materials can be protected from the ravages of pathogenic bacteria and fungi, by applying to said plants, harvested crops or materials an effective amount of a compound or mixture of compounds of the present invention.

Advantageously, the compounds of the invention are amenable to formulation with both liquid and solid diluents or carriers.

Dust formulations which may be applied directly to plant foliage, fabrics, harvested crops and the like, can be prepared by dispersing, generally, about 1% to 25% by weight of the active ingredient in a finely divided solid carrier such as kaolin, talc, attapulgite, sulfur or fuller's earth. These formulations may be applied with conventional dusting equipment and we have found that in the treatment of growing crops generally about 1/16 lb. to 8 lbs. and preferably 1/4 lb. to 4 lbs. per acre of active ingredient is effective for protecting such crops against attack by pathogenic bacteria and fungi.

Wettable powders are prepared in substantially the same manner as described in connection with dust formulations. However, generally about 25 to 90% of active ingredient is dispersed in about 2 to 75% of finely divided solid diluent with about 1% to 4% by weight of a wetting agent such as sodium isethionate or sodium N-methyl-N-oleoyltaurate and from about 2% to 8% of a dispersing agent such as an alkali metal lignin sulfonate or naphthalenesulfonate. For application, the wettable powder is usually dispersed in water in sufficient amount to provide from about 1/16 lb. to 2.0 pounds of active ingredient per 100 gallons of water and applied at the rate of about 100 to 400 gallons per acre. For aerial application at high concentration 1 to 4 pounds per acre of active ingredient applied in a maximum 20 gallons of spray is usually effective for protecting plants against bacteria and fungi.

In order that the present invention may be more fully understood the following examples are given primarily by way of illustration. No specific details or enumeration contained therein should be construed as limitations on the present invention, except so far as they appear in the appended claims. All parts and percentages are by weight unless otherwise specifically designated.

EXAMPLE 1

Preparation of 3-dithiocarboxy-1,1,2,2-tetramethylguanidonium hydroxide, inner salt ("zwitterion")

Tetramethylguanidine, (12.0 g., 0.104 mole) is added to a cold solution of sodium hydroxide (4.0 g., 0.1 mole) in water (30 ml.). Carbon disulfide (7.6 g., 0.1 mole) is added to the cold (7–8° C.) stirred mixture in portions, and the mixture is allowed to warm to 27° and finally 30°. Stirring is continued for about 1 hour and the resulting clear orange solution of sodium bis(dimethylamino) methylenedithiocarbamate is diluted with water (20 ml.), and slowly neutralized (to about pH 8) with glacial acetic acid (6.0 g., 0.1 mole) while the temperature is held at from —2° to +2° C.

The resulting golden-yellow precipitate is filtered off, washed with absolute ethanol and then with ether. The product, having a M.P. 90–95°, is obtained.

Analysis.—Calcd. for $C_6H_{13}N_3S_2$ (percent): C. 37.67; H, 6.85; N, 21.97; S. 33.53. Found (percent): C, 37.47; H, 6.84; N, 21.54; S. 33.68.

EXAMPLE 2

Preparation of bis[bis(dimethylamino)methylene]thiocarbamoyl disulfide

To a solution of tetramethylguanidine (23.0 g., 0.2 mole) and sodium hydroxide (8.2 g., 0.2 mole) in water (40 ml.) is added dropwise with stirring, carbon disulfide (15.3 g., 0.2 mole) at a temperature between 20 and 30° C. The resulting mixture is stirred for 3 hrs. at about 25° C. An orange solution of sodium bis(dimethylamino) methylenedithiocarbamate is obtained.

The orange solution is diluted with 150 ml. of water and cooled to 2–9° C. during the addition over a 43 min. period with stirring of a solution composed of 40 g. of 25% sulfuric acid and 11.3 g. of 30% hydrogen peroxide. The reaction mixture is allowed to stir for 0.5 hr., and then the precipitated solid is filtered off, washed with water and dried in air.

The solid, wt. about 30 g., melts at 103–104° C. Its infrared spectrum shows a weak band at about 990 cm.$^{-1}$, corresponding to a strong, very characteristic band in the spectrum of 5-dimethylamino-3H-1,2,4-dithiazole-3-thione. Recrystallization of a 5 g. sample from chloroform-carbon tetrachloride solution gives 1.7 g. of material melting at 106.5–108° C., which no longer shows infrared absorption at 990 cm.$^{-1}$. The recrystallized material is used for analysis.

*Analysis.*—Calcd. for $C_{12}H_{24}N_6S_4 \cdot \frac{1}{2} H_2O$ (percent): C, 36.99; H, 6.47; N, 21.57; S, 32.92. Found (percent): C, 37.01; H, 6.15; N, 20.82; S, 33.13.

EXAMPLE 3

5-dimethylamino-3H-1,2,4-dithiazole - 3 - thione (I) from the reaction mixture in the preparation of bis[bis(dimethylamino)methylene]thiocarbamoyl disulfide (II)

A solution of sodium bis(dimethylamino)methylenedithiocarbamate (0.25 mole) in water (150 ml.) is cooled to 0° C. and neutralized to pH 8 with glacial acetic acid (12.0 g., 0.2 mole). The resulting slurry (of zwitterion, both in solution as a precipitate, and of sodium salt) is cooled to from −7° C. to −3° C. and 15% aqueous hydrogen peroxide (4.25 g., 0.125 mole of $H_2O_2$) is added dropwise over 1 hr. The cooling bath is removed and the reaction temperature is allowed to warm to 11° C. The reaction mixture is again cooled to −3° C. and the solid, which is impure disulfide, is removed by filtration. The aqueous filtrate of the above disulfide is cooled to 0° C. and treated with 6.4 ml. of 30% hydrogen peroxide (2.12 g., 0.062 mole of $H_2O_2$) added dropwise. The resulting precipitate is filtered off, washed with water and dried in air. The precipitate, M.P. 133–171° C. (sinters 100° C.), is a yellow powder.

Two recrystallizations of the powder from methylene chloride-carbon tetrachloride solution gives essentially pure (by thin-layer chromatography) product, M.P. 175–177.5° C. (prior sintering). The product is determined to be 5-dimethylamino-3H-1,2,4-dithiazole-3-thione by infrared and mass spectroscopy, and elemental analysis.

*Analysis.*—Calcd. for $C_4H_6N_2S_3$ (percent): C, 26.94; H, 3.39; N, 15.71; S, 53.95. Found (percent): C, 27.16; H, 3.42; N, 15.97; S, 53.64.

The reaction is graphically illustrated below.

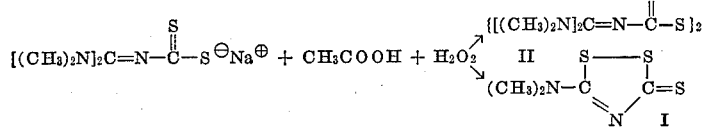

EXAMPLE 4

Preparation of 5-dimethylamino-3H-1,2,4-dithiazole-3-thione

A stirred slurry of the 3-dithiocarboxy-1,1,2,2-tetramethylguanidonium hydroxide, inner salt ("zwitterion") (15.3 g., 0.080 mole) in water (75 ml.) is cooled to 7–8° C. during the dropwise addition of sulfur monochloride (5.40 g., 0.040 mole). The cooling bath is removed and the stirred slurry is allowed to warm to room temperature. Stirring at room temperature is continued for 2 hrs. The insoluble product is filtered off, washed with water, and dried in air. The crude product, weight 10.8 g., is recrystallized without heat from methylene chloride-carbon tetrachloride solution to give 9.1 g. of 5 - dimethylamino-3H-1,2,4-dithiazole-3-thione, M.P. 173.5–178° (prior sintering). The product is identical by infrared spectroscopy to the product isolated in Example 3.

EXAMPLE 5

Alternate synthesis of 5-dimethylamino-3H-1,2,4-dithiazole-3-thione

A mixture of 1,1-dimethylthiourea (15.6 g., 0.15 mole) carbon disulfide (11.4 g., 0.15 mole) and potassium hydroxide (9.6 g., of 87% KOH, 0.15 mole) in 150 ml. of dimethylformamide is vigorously stirred for 19 hr. at 25°. During this time the potassium hydroxide dissolves and a precipitate forms, which in turn dissolves on further stirring to give a solution. The solution is diluted with ether and the lower layer is triturated with several portions of ether until a yellow solid precipitate is obtained. The yellow solid precipitate is dissolved in water and air is passed through the solution at 25° C. The resulting precipitate is identified as 5-dimethylamino-3H-1,2,4-dithiazole-3- thione by melting point and infrared spectroscopy.

Following the above procedure but substituting 1,1-diethylthiourea, 1,1-diisopropylthiourea or 1,1-dibutylthiourea for 1,1-dimethylthiourea in the above reaction yields respectively the corresponding 5-diethylamino-, 5-diisopropylamino-, or 5-dibutylamino-3H-1,2,4-dithiazole-3-thione.

EXAMPLE 6

A crude mixture of bis{[bis(methylamino)methylene] thiocarbamoyl}disulfide and 5-dimethylamino-3H-1,2,4-dithiazole-3-thione is suspended in water in sufficient amount to provide 100 p.p.m. of said mixture in the water. The solution is placed in one dram "opticlear" vials and separately inoculated with one drop of a spore suspension prepared from 7-day cultures of *Aspergillus niger*, a saprophyte responsible for degradation of textiles, fabrics, leather and vegetables, *Monilinia fructicola* or *Stemphylium sarcinaeforme*, all grown on potato-dextrose agar. The vials containing the separately inoculated solution of test compounds are then capped and placed on a rotating tumbler for 24 hours to assure contact of the organism with test compound. After 24 hours, the vials are removed and examined for inhibition of growth of mycelium. At 100 p.p.m. of the mixture, 100% inhibition of each of the organisms named-above is obtained.

The above procedure is repeated employing 100, 10 and 1 p.p.m. of 5-dimethylamino-3H-1,2,4-dithiazole-3-thione alone. 100% inhibition of Monilinia is obtained at all rates. 100% inhibition of Stemphylium is obtained at 10 and 100 p.p.m. with 95% inhibition at 1 p.p.m. and 100% inhibition of Aspergillus is achieved at 100 p.p.m. while 95% inhibition is obtained at 10 and 1 p.p.m.

EXAMPLE 7

The exceptional activity of the compounds of the invention for protecting living plants against attack by pathogenic fungi is demonstrated by the following tests. In these tests the foliage of "Bonnie Best" tomato plants and "Early Marketer" cucumber plants are sprayed to "run off" with 50/50 aqueous/acetone solutions or suspensions containing 100, 50, 25, 12, 6 or 3 p.p.m. of 5-dimethylamino - 3H - 1,2,4 - dithiazole - 3 - thione (a compound of the invention) or manganous ethylenebisdithiocarbamate (a commercial broad-spectrum foliage fungicide for tomatoes, cucurbits and other vegetables). The plants are permitted to dry and then sprayed with a mixed inoculum of *Phytophthora infestans* (tomato late blight) and *Colletotrichum obliculare* (cucumber anthracnose). The inoculated plants are then placed in a constant temperature cabinet maintained at 62° F. with a moisture saturated atmosphere. After 24 hours the temperature is elevated to 70° F. and maintained at said temperature for an additional 72 hours. After this incubation period the treated plants are removed from the cabinet and placed in a greenhouse. Seven days after inoculation readings on disease control are made and recorded. Disease incidence is rated as follows.

5=Complete control, no disease on treated foliage
4=Trace
3=Slight
2=Moderate
1=Severe, no disease control Data obtained are reported below:

| Compound | Anthracnose (rates in p.p.m.) | | | | | |
|---|---|---|---|---|---|---|
| | 100 | 50 | 25 | 12 | 6 | 3 |
| (CH₃)₂N—[structure] | 5 | 5 | 5 | 5 | 4 | 4 |
| Manganous ethylenebisdithiocarbamate | 4 | 4 | 3 | 2 | 1 | 1 |
| | Blight | | | | | |
| (CH₃)₂N—[structure] | 5 | 5 | 4 | 4 | 3 | 3 |
| Manganous ethylenebisdithiocarbamate | 4 | 4 | 2 | 2 | 1 | 1 |

EXAMPLE 8

The antifungal activity of a compound of the instant invention, i.e. 5 - dimethylamino - 3H - 1,2,4 - dithiazole-3-thione, is demonstrated by the following test wherein Bonnie Best tomato plants with 4 true leaves and Early Marketer cucumber plants with 2 true leaves are sprayed with an aqueous/acetone solution containing the above identified compound.

The plants are sprayed to run off with solution containing from 3 to 100 p.p.m. They are then permitted to dry and inoculated with an aqueous suspension containing mixed inoculum of Colletotrichum obiculare (cucumber anthracnose) and Phtophthora infestans (tomato late blight) and placed in a constant temperature and humidity cabinet. Said cabinet is maintained at 62° for 24 hours. The temperature is then raised to 70° and maintained at this temperature for 72 hours. During the entire incubation a moist saturated atmosphere is employed. After incubation the plants are removed from the cabinet and placed on greenhouse benches where they are cared for in accordance with conventional greenhouse practices. Seven days after inoculation, all plants are examined and rated according to disease incidence.

The index employed is as follows:

5=Complete control, no disease on treated foliage
4=Trace
3=Slight
2=Moderate
1=Severe, no disease control The data obtained in the above tests are as follows:

| Compound rate in ppm. | Cucumber anthracnose | Late blight |
|---|---|---|
| 100 | 5 | 5 |
| 50 | 5 | 5 |
| 25 | 4 | 4 |
| 12 | 4 | 3 |
| 6 | 4 | 3 |
| 3 | 3 | 3 |

EXAMPLE 9

Following the procedure of Example 1 above, by substituting a 25% wettable powder, dispersed in water in amounts sufficient to provide from 3 to 25 p.p.m. of the active ingredient (i.e. 5 - dimethylamino - 3H - 1,2,4 - dithiazole - 3 - thione) tomato and cucumber plants were sprayed to run off with an aqueous solution of said wettable powder. The plants were allowed to dry, inoculated with a mixed inoculum of the causative agents for cucumber anthracnose and tomato late blight and incubated as described above. After the incubation period, the plants were removed to the greenhouse and 7 days after the inoculation the plants were examined and rated according to the index set forth in Example 1. Results obtained are provided below:

| Compound rate in p.p.m. | Cucumber anthracnose | Late blight |
|---|---|---|
| 25 | 5 | 5 |
| 12 | 5 | 5 |
| 6 | 5 | 4 |
| 3 | 5 | 3 |

The 25% wettable powder was prepared by milling together 25% by weight of the active ingredient, 2% of an anionic wetting agent, 2.5% of a dispersant, 3 % of hyanionic wetting agent, 2.5% of a dispersant, 3% of hydroxy cellulose and 67.5° of attapulgite clay.

EXAMPLE 10

The antifungal activity of the compounds of the present invention against a variety of organisms including Monilinia fructicola, the pathogen which incites American brown rot in stored fruits; Pythium deBaryanum, the causative agent for tuber rot, seed decay and root and stem rot in a variety of plants; Rhizoctonia solani, the pathogen which also incites root and stem rot in plants; Stemphylium sarcinaeforme, the causative agent for leaf spot on several legumes; Pseudomonas solanacaearum, which incites bacterial wilt and Verticillium albo-atrum, which is the causative agent for cotton wilt, is demonstrated by the following tests.

Chemical to be evaluated (i.e. 5-dimethylamino-3H-1,2,4-dithiazole-3-thione), is incorporated in a Sabauraud's dextrose agar in an amount sufficient to provide from about 12½ to 100 p.p.m. of active ingredient. The active compound is mixed with 20 ml. of the agar in a petri dish and permitted to solidify. One petri dish is used for each rate of compound and each plate is inoculated with all test organisms set forth above. The plates are then covered and incubated for 72 hours at 32° C. After incubation results are observed and recorded as the least concentration in p.p.m. of test compounds to inhibit growth.

In these tests it was found that 100 p.p.m. of the above named compound was sufficient to inhibit the growth of all organisms. 50 p.p.m. prevents the growth of Rhizoctonia, Pythium and Verticillium. 25 p.p.m. prevents the growth of Stemphylium and 12½ p.p.m. prevents the growth of Monilinia.

We claim:
1. A compound of the formula:

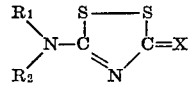

wherein $R_1$ and $R_2$ are lower alkyl and X is sulfur or oxygen.

2. A compound according to claim 1 wherein $R_1$ and $R_2$ are methyl and X is sulfur.

3. A compound according to claim 1 wherein $R_1$ and $R_2$ are ethyl.

4. A compound according to claim 1 wherein $R_1$ and $R_2$ are butyl.

5. A compound according to claim 1 wherein $R_1$ and $R_2$ are isopropyl.

6. A compound according to claim 1 wherein $R_1$ and $R_2$ are propyl.

7. A process for preparing compound of the formula

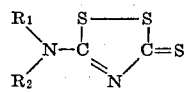

wherein $R_1$ and $R_2$ are lower alkyl which comprises reacting a tetra(loweralkyl)guanidine with carbon disulfide and a strong base to form a bis(dialkylamino)methylenedithiocarbamic acid salt converting said salt to an inner salt by treatment with a non-oxidizing acid and thereafter reacting the thus formed inner salt with sulfur monochloride to prepare the corresponding 5-di(lower-alkyl)amino-3H-1,2,4-dithiazole-3-thione.

References Cited

Bradsher et al.: J. Am. Chem. Coc., 80, 414–7 (1958).
Freund et al.: Ann., 285, 174–9 (1895).

ALEX MAZEL, Primary Examiner

R. J. GALLAGHER, Assistant Examiner

U.S. Cl. X.R.

260—299, 513.5; 424—245, 270